piece 17 is clamped between jaws 18 and 19 of fixture 13 with fixture 10 at rest. A rotating workpiece 20 is in position within the holding fixture 21 so that a welding operation may take place. When the welding operation is completed, the welded assembly 17a is released from the rotatable fixture 21 and the machine bed 34 is moved away from the spindle 14. That portion of the welded assembly 17a held within the rotatable holding fixture is thereby removed from the spindle.

Hydraulic cylinder 71 is then actuated to retract jaw 19 from clamping engagement with the welded assembly 17a. As jaw 19 retracts, kickout lever 67 will contact the welded assembly and it will come to rest in the small depression 66 of the kickout lever. If the welded assembly should have a tendency to stick within jaw 19, it will come in contact with kickout lever 68 and be forced out of the jaw.

When the welded assembly 17a is released by jaws 18 and 19, operation of the motor assembly 52 automatically starts. As motor shaft 55 rotates, arms 31 and 32 are caused to move the jaws 58 and 59 along paths 63 and 64. A completed weld assembly 17a is picked up from the fixture 13 by jaw 59 and further movement of arms upward will cause jaw 58 to pick up a nonrotatable workpiece 17 from the loading rack 11. Further upward movement of the arms will cause jaws 58 and 59 to straddle the unloading rack 12 and the completed weld assembly 17a is deposited onto the rack. The completed weld assembly 17a may for example, roll down the rack and be deposited into a collection container or onto a conveyor belt.

As the motor shaft 55 continues in one revolution of travel, the arms 31 and 32 continue on their downward movement as outlined by envelopes 63 and 64. At the moment that the jaws 58 and 59 clear the clamping jaws 18 and 19, pin 99 depresses limit switch 94 which actuates hydraulic cylinder 71 to clamp the workpiece 17 between jaws 18 and 19. The arms 31 and 32 continue in motion until pin 100 depresses limit switch 95 which signals motor assembly 52 to stop. At this point, the fixture 10 is again in a rest position as shown in FIG. 1.

As the arms 31 and 32 are moving downwardly, the cam 107 contacts the plunger 108 of the deceleration valve 54 to absorb some of the inertial energy of the downwardly moving arms. The deceleration valve slows the movement of the assembly so that no shocks are experienced as the arms 31 and 32 come to a rest position. With the arms in a rest position, the fixture is conditioned for another welding cycle. Besides stopping the motor assembly 52, the limit switch 95 may also automatically initiate a subsequent weld cycle for the welding machine.

Referring again particularly to FIG. 1, it may be noted that the links 113 are substantially shorter than the interconnecting links 73. It is also of importance to note that the motor 52 is interconnected with the arms 31 and 32 through the shorter links 113. This arrangement together with the relative spacing between the links and the length of the arms 31 and 32 serves two important functions. Initially, it may be noted that this arrangement establishes the configuration of the cyclical paths 63 and 64. The configuration of the paths is selected to facilitate reception of the workpiece 17 by the loading and unloading jaws 58 and 59. Note that the jaws are traveling almost vertical when they initially engage the workpiece. In addition, with the motor being coupled to the arms through the shorter link, a complete operating cycle is performed with one revolution of the motor. A complete operating cycle includes removal of a finished workpiece from the jaws 18, 19 by the jaw 59 and insertion of a new workpiece 17 by the loading jaw 58. Within the present embodiment, each cycle also includes the depositing of a finished workpiece in the unloading rack 12 and removal of another workpiece from the loading rack 11. It is particularly desirable to limit the motor to one revolution for each operating cycle since this greatly simplifies control of the parts handling fixture through the limit switches 94, 95 and the switch 53 for deactuating the deceleration valve 54.

We claim:

1. A parts handling fixture for moving workpieces from a loading rack means to a work fixture and for moving finished workpieces from the work fixture to an unloading rack means, comprising
   a support structure,
   an elongated arm with spaced apart workpiece loading and unloading means,
   rotating link means pivotably interconnecting the elongated arm at two locations with the support structure, and
   motor means for moving the arm relative to the support structure,
   the interconnection of the rotating link means with the arm and support structure being selected to cause movement of the workpiece loading means and workpiece unloading means along offset generally circular paths between the work fixture and the loading rack means and between the work fixture and the unloading rack means respectively, the rotating link means comprising two links of different lengths being pivotably interconnected between the arm and support structure.

2. The parts handling fixture of claim 1 wherein the motor means is interconnected between the arm and support structure by means of one of the rotating link means.

3. The parts handling fixture of claim 1 further comprising limit switch control means for actuating the motor means and for deactuating the motor means after a complete operating cycle wherein a finished workpiece is removed from the work fixture by the unloading means and another workpiece is positioned in the work fixture by the loading means.

4. The parts handling fixture of claim 3 further comprising decelerator means for absorbing a portion of the inertia in the arm toward the end of an operating cycle.

5. The parts handling fixture of claim 1 wherein the motor means is interconnected between the arm and the support structure by means of a shorter one of the links.

6. The parts handling fixture of claim 5 further comprising limit switch control means for actuating the motor means and for deactuating the motor means after a complete operating cycle wherein a finished workpiece is removed from the work fixture by the unloading means and another workpiece is positioned in the work fixture by the loading means.

7. The parts handling fixture of claim 6 further comprising decelerator means for absorbing a portion of the inertia in the arm toward the end of an operating cycle.

8. The parts handling fixture of claim 5 wherein the work fixture is a part of a friction welding machine for securing a weld member in relatively rotatable relation with another weld member.

* * * * *

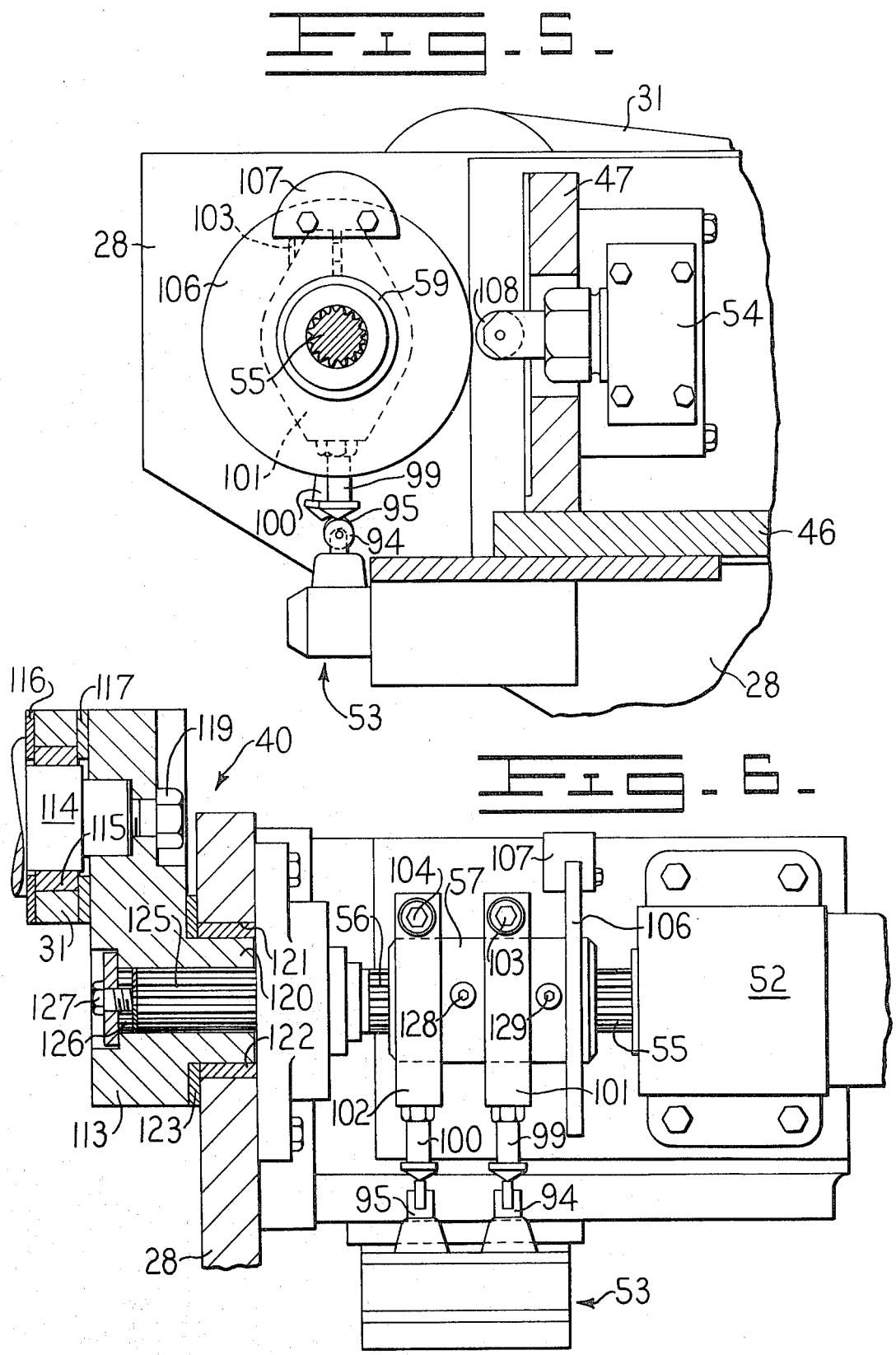

PARTS HANDLING FIXTURE

BACKGROUND OF THE INVENTION

The present invention relates to a parts handling fixture and more particularly to a fixture which is capable of automatic operation including loading a part into a machine or work fixture for a work operation and automatically unloading a completed or finished workpiece from the work fixture within the same cycle. It is further contemplated that a loading rack and an unloading rack be associated with the parts handling fixture, finished workpieces being moved from the work fixture to the unloading rack and a new workpiece being moved from the loading rack to the work fixture.

The fixture is particularly intended for use with a friction welding machine wherein weld parts are transferred from a loading rack to the welding machine, completed weld parts being moved from the welding machine to the unloading rack within each operating cycle. For such an operation, the fixture is also contemplated to be operable in conjunction with an automatic cycle of a friction welding machine. However, it will be apparent that the present fixture is not limited to use in conjunction with friction welding machines but may also be used in combination with other work fixtures such as different types of machine tools. Parts handling fixtures for removing finished parts from work fixtures and installing new parts are known in the prior art. However, the present invention provides a relatively simple and reliable fixture for performing such operation.

SUMMARY OF THE INVENTION

It is a particular object of the present invention to provide a relatively simple parts handling fixture wherein finished workpieces are removed from a work fixture and a new workpiece is installed therein within a single operating cycle.

In accomplishing this object, the present invention provides loading and unloading means pivotably mounted upon a support structure by rotating means for movement along relatively offset cyclical paths between the work fixture and a loading rack and between the work fixture and an unloading rack respectively.

It is another object of the invention to provide such a parts handling fixture wherein an interconnecting arrangement between the loading and unloading means with the support structure is designed to facilitate movement of finished and unfinished workpieces out of and into the work fixture.

To accomplish this object, loading and unloading means are arranged in spaced apart relation upon an elongated arm, the rotating means being links of different lengths for interconnecting the arm with the support structure. Within this arrangement, a motor means for moving the loading and unloading means relative to the support structure is preferably interconnected therebetween by means of a shorter one of the lengths.

Other objects and advantages of the present invention are made apparent in the following description having reference to the accompanying drawings.

BRIEF DESCRIPTION OF THE DRAWINGS

FIG. 5 is an enlarged view of a decelerating valve operable in conjunction with the fixture and means for actuating the valve, taken generally along lines V—V of FIG. 2.

FIG. 6 is an enlarged view of motor means, associated limit switches and the switch actuating means for the decelerating valve, taken generally along the lines VI—VI of FIG. 1.

DETAILED DESCRIPTION OF THE INVENTION

Figure 1:
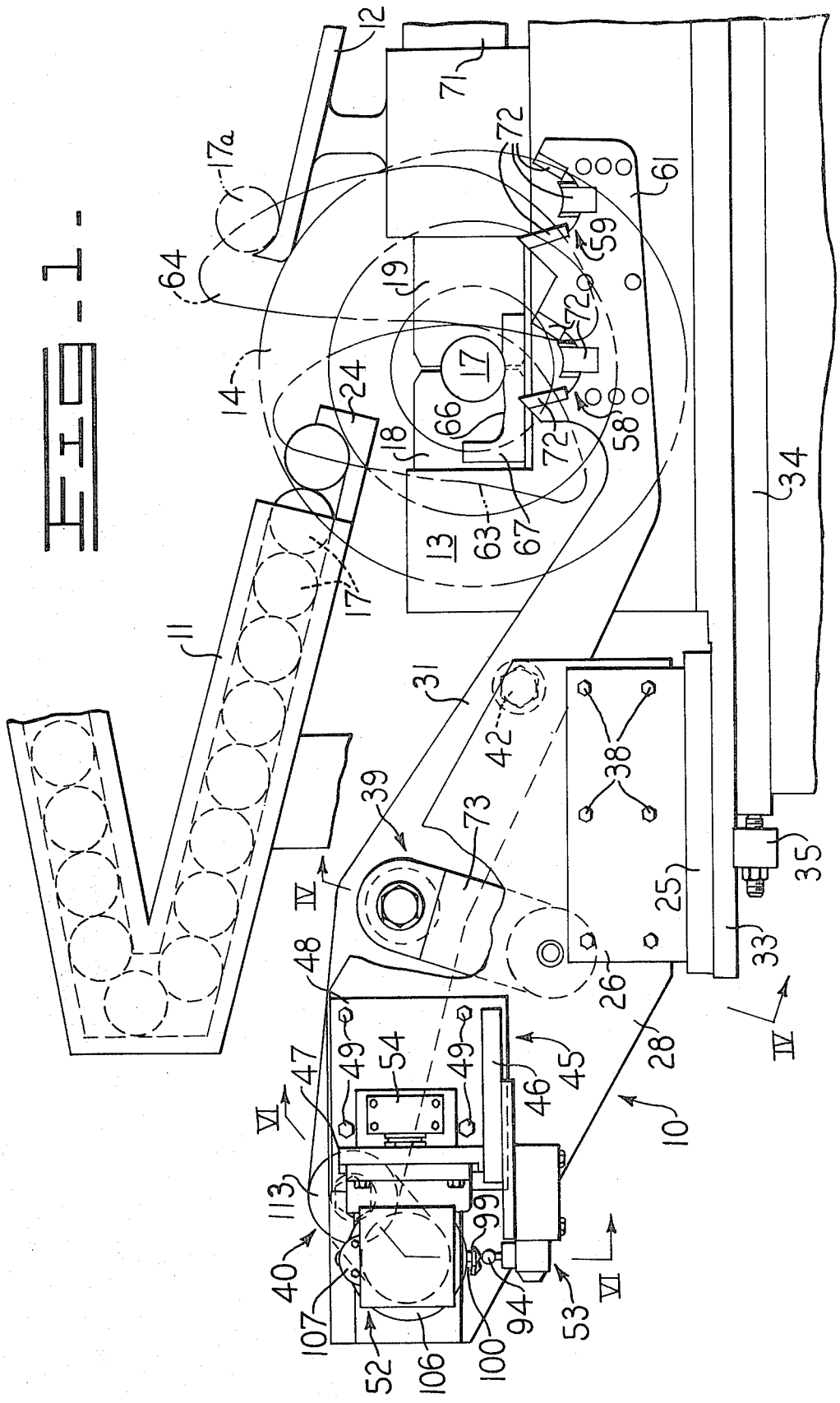
FIG. 1 is a side elevation view of a parts handling fixture constructed according to the present invention while illustrating portions of a loading rack, an unloading rack and a work fixture embodied as a non-rotating fixture in a friction welding machine.
Figure 2:
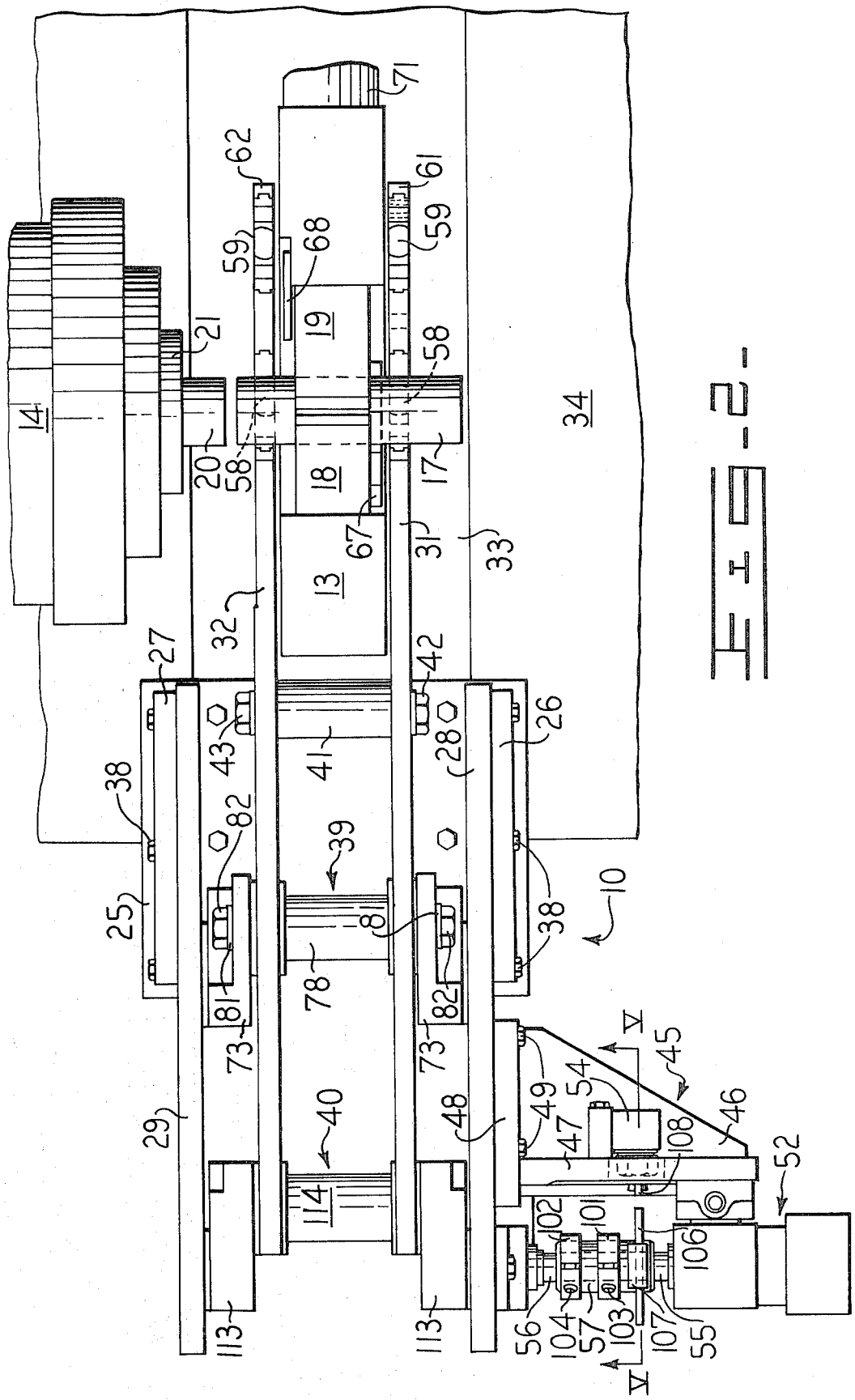
FIG. 2 is a plan view of the parts handling fixture of FIG. 1 while also illustrating a rotatable spindle within a friction welding machine, the loading and unloading racks being removed to better illustrate the parts handling fixture.

Referring particularly to FIGS. 1 and 2, a parts handling fixture constructed according to the present invention is generally indicated at 10 in conjunction with a parts loading rack 11, a parts unloading rack 12, a machine or work fixture 13 for holding a non-rotatable workpiece and a spindle assembly 14 for holding a rotatable workpiece. The work fixture 13 and spindle assembly 14 are preferably portions of a friction welding machine with the workpieces being weld members to be bonded together during a friction welding operation.

A non-rotatable workpiece 17 is clamped between jaws 18 and 19 of the work fixture 13. A rotatable workpiece 20 is secured within a holding fixture 21 on the spindle 14 (see FIG. 2). The parts unloading rack 11 contains a plurality of non-rotatable workpieces 17 which are automatically fed downwardly within the rack by gravity. A lip 24 on the rack prevents the workpieces from rolling out of the rack.

The parts handling fixture 10 includes a base plate 25, a pair of vertical side plates 26 and 27, a pair of support plates 28 and 29, and two movable arms 31 and 32. The base plate 25 is arranged upon a fixture frame structure 33 which in turn is secured to the machine table 34. Adjusting screws, one of which is indicated at 35, allow the machine fixture 13 to be adjusted on the machine table.

The side plates 26 and 27 are integrally secured to the base plate 25, for example by welding. The support plates 28 and 29 are secured to the side plates 26 and 27 respectively by cap screw 38.

Arms 31 and 32 are movably mounted between plates 28 and 29 by a pair of link assemblies 39 and 40. A pin 41 and cap screws 42 and 43 additionally serve to rigidly secure the two arms 31 and 32 together. Construction of the link assemblies 39 and 40 is described in greater detail below. However, it is noted that the link assembly 39 provides for a greater offset relation between the arms 31, 32 and the support plates 28, 29 than does the link 40 in order to simplify operation of the parts handling fixture 10 in a manner which is also described in greater detail below.

A support structure 45, fabricated from plates 46, 47 and 48, is fastened to support plate 28 by cap screws 49 and supports a motor assembly 52, a limit switch assembly 53 and a deceleration valve 54. An output shaft 55 for the motor 52 is coupled to a link-rotating shaft 56 by a coupling 57.

Figure 3:
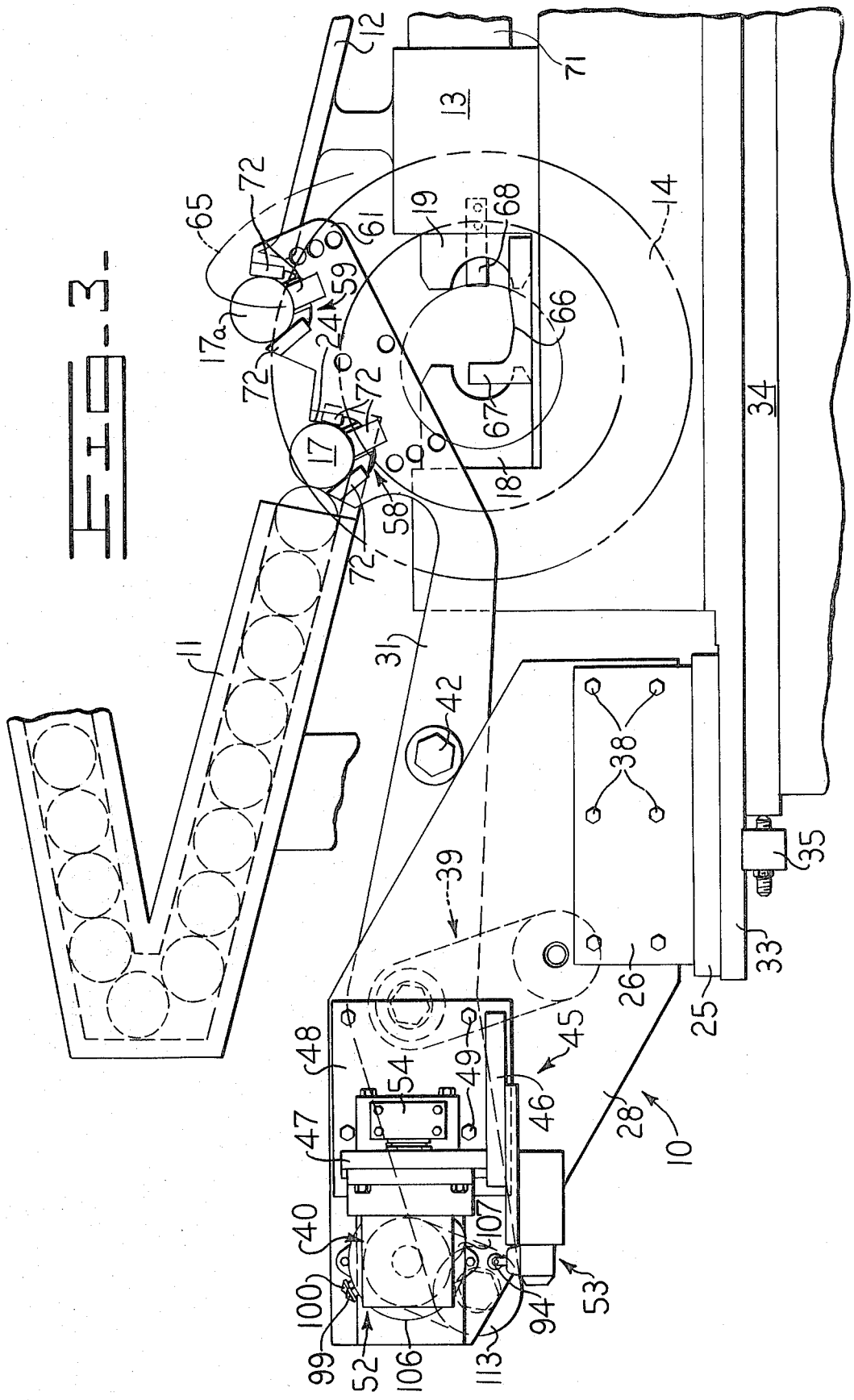
FIG. 3 is a side elevation view similar to FIG. 1 with the fixture being generally positioned to deposit a finished workpiece in the unloading rack and to pick up a new workpiece from the loading rack.

With particular reference to FIGS. 1, 2 and 3, the two arms 31 and 32 straddle the non-rotatable machine fixture 13 and are moved relative to the fixture 13 by the motor assembly 52. A pair of workpiece holding jaws 58 and 59 are carried on ends 61 and 62 of the arms 31 and 32 respectively. As the arms move, the jaws 58, 59 move along generally circular or cyclical paths represented by envelopes 63 and 64 which are illustrated in phantom in FIG. 1. As the jaw 59 moves in a clockwise direction along path 64, it picks up the completed weld assembly 17a, previously released by the jaws 18 and 19. As the other jaw 58 moves in a clockwise direction along path 63, it picks up a workpiece 17 from the loading rack 11. The arms 31 and 32 are shown in this position in FIG. 3. Further movement of the arms causes jaw 59 to move along path 64 and deposit the completed weld assembly 17a on the unloading rack 12.

As the loading jaw 58 moves downwardly along path 63, the workpiece 17 is deposited between jaws 18 and 19. The arms 31 and 32 then come to rest below the jaws in a position illustrated in FIG. 1. Prior to clamping of the workpiece between the jaws 18 and 19, the workpiece rests in a shallow depression 66 formed adjacent a kickout lever 67. The lever 67 is fastened to the movable jaw 19 and serves to force the workpiece out of the jaw 18 if it should have a tendency to stick. A second kickout lever 68 is fastened to the fixture 13 in order to push the workpiece out of the jaw 19 if it should have a tendency to stick therein.

With arms 31 and 32 in a rest position as shown in FIG. 1, a hydraulic cylinder, a portion of which is shown at 71, is actuated and shifts movable jaw 19 toward the stationary jaw 18 to clamp the weld specimen 17 between the jaws. A weld operation then proceeds to join the rotatable workpiece 20 to the non-rotatable workpiece 17.

Small magnets 72 are fastened to the loading and unloading jaws 58 and 59 to help maintain the workpiece 17 within the jaws during the loading and unloading operation. In some cases, the magnet might be replaced for example by hardened inserts. It is noted that the arms 31 and 32 of the parts handling fixture are not necessarily limited to an arrangement where they straddle the machine fixture 13. For example, a single arm might be used or differently configured arms depending on the application and characteristics of the work fixture.

Figure 4:
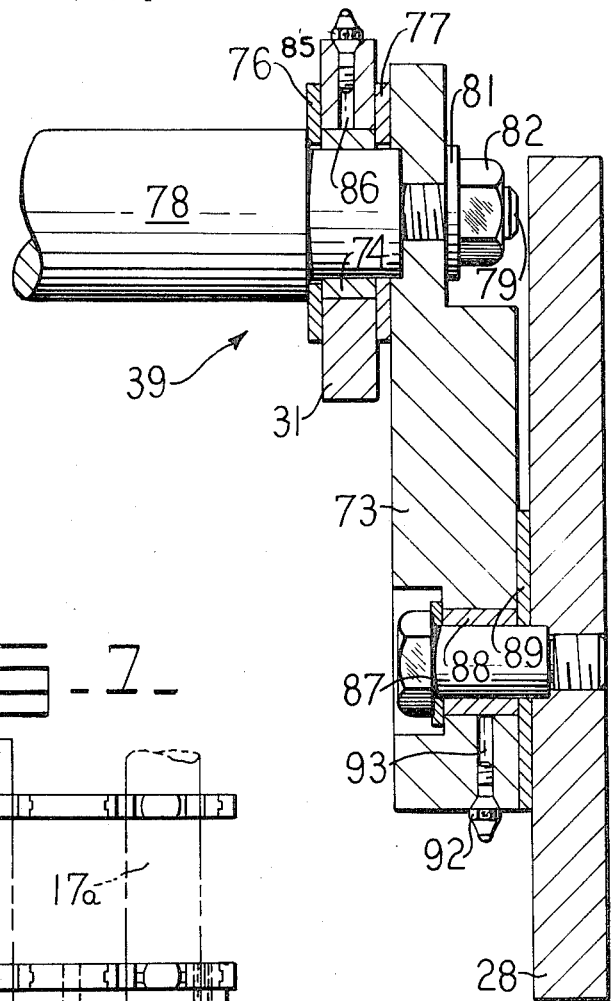
FIG. 4 is an enlarged view of one end of an oscillating link within the fixture, taken generally along line IV—IV of FIG. 1.

Having particular reference to FIG. 4, each end of the link assembly 39 includes a link 73, a bushing 74, a pair of thrust washers 76 and 77 and a common circular pin 78 extending between the two links 73. Each link 73 is fastened to the pin 78 in non-rotating relation by a stud 79, a washer 81 and a nut 82. Oscillatory motion between either arm 31, 32 and the pin 78 is provided by the bushing 74 and the thrust washers 76 and 77. A lubrication fitting 85 and passage 86 provides means for lubricating the bushings and thrust washers.

The link 73 shown in FIG. 4 is fastened to stationary support plate 28 by a shoulder bolt 87 which threads into plate 28. A bushing 88 and a thrust washer 89 provide for oscillatory motion between the link 73 and the stationary support plate 28. A lubrication fitting 92 and passage 93 provide for lubricating the bushing and the thrust washer. The opposite link is similarly mounted on the other plate 29.

The limit switch assembly 53 and deceleration valve 54 are shown in greater detail in FIGS. 5 and 6. In this particular embodiment, the switch assembly includes two switches 94 and 95 which are actuated by pins 99 and 100, respectively. Switches 94 and 95 serve to control various functions of the welding machine and the parts handling fixture; however, the specific number and arrangement of switches could be varied, depending upon requirements of the apparatus and procedure. Pins 99 and 100 are fastened to split brackets 101 and 102, respectively, which are clamped around coupling 57 by cap screws 103 and 104.

A circular disc 106 is also carried on coupling 57 and a semicircular cam 107 is fastened to the disc. As the disc rotates with the coupling 57, the cam 107 contacts a plunger 108 of the deceleration valve 54. Due to the force required to push the plunger into the valve, and the friction created between the plunger and the cam, a portion of the inertia inherent in the rotating members of the system and the movable arms is absorbed and the acceleration rate of the arms is reduced as they move toward a rest position. It is possible that this deceleration valve could be eliminated depending upon the size of the fixture arms and the speed of rotation of motor assembly 52.

One end of the link assembly 40 is shown in greater detail in FIG. 6 and includes a link 113, a common circular pin 114 extending across the assembly, a bushing 115, and two thrust washers 116 and 117. Pin 114 is securely fastened to link 113 by a cap screw 119. Arm 31 is clamped between pin 114 and link 113, the pin 114 being allowed to rotate relative to the arm by the bushing 115 and thrust washers 116 and 117. A cylindrical projection 120 on the link 113 extends into a bore 121 of support plate 28, a bushing 122 and thrust washer 123 providing support and allowing rotation of the link relative to the plate 28. Link 113 is moved by link rotating shaft 56 which is secured to motor shaft 55 by coupling 57. A splined portion 125 of the shaft 56 meshes with an internal spline portion 126 of the link. A cap screw 127 secures the link 113 to the shaft 56. Set screws 128 and 129 lock the coupling 57 to shafts 56 and 55. The other arm 32 is similarly coupled to the common pin 114 and to the other support plate 29 so that both arms 31 and 32 are moved together by motor 52 acting through shafts 55, 56 and 125.

Figure 7:
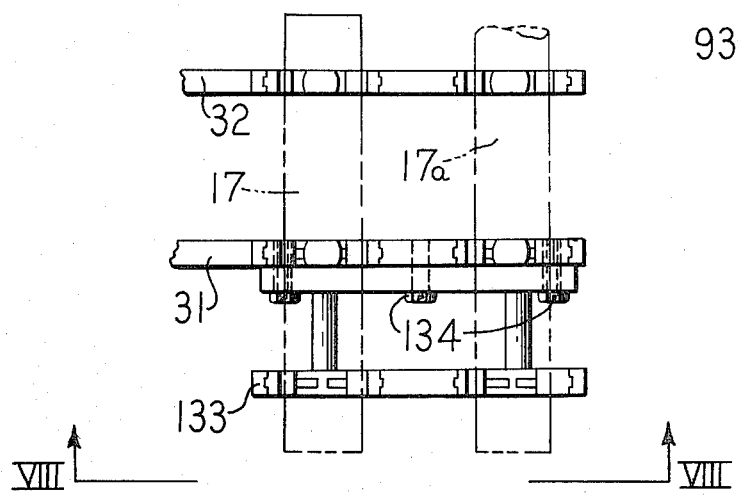
FIG. 7 is a plan view of a portion of the fixture illustrating an extension usable with the fixture for example to handle longer workpieces.
Figure 8:
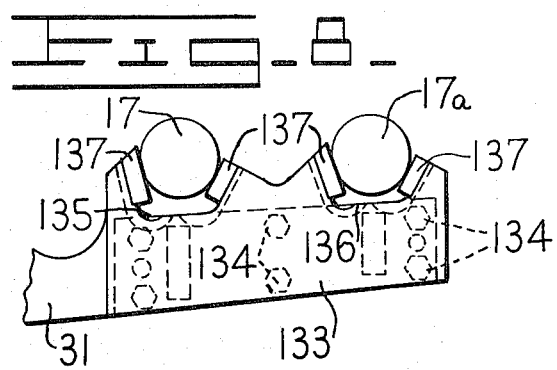
FIG. 8 is a side elevation view of FIG. 7 taken along the line VIII—VIII of FIG. 7.

FIGS. 7 and 8 of the drawings illustrate an extension 133 which can be secured to arm 31 by a plurality of cap screws 134. Extension 133 contains a pair of workpiece jaws 135 and 136 which are similar to jaws 58 and 59 of arms 31 and 32. The extension may be used, for example, to support overhang of an extra long workpiece. If desired, magnets 137 may also be used in the jaws 135 and 136 to help hold the workpiece 17.

Although the manner of operation for the above described components is believed to be obvious, a brief description of a typical operation for the parts handling fixture is set forth below. With the parts handling fixture 10 in the position shown in FIGS. 1 and 2, a workpiece 17 is clamped between jaws 18 and 19 of fixture 13 with fixture 10 at rest. A rotating workpiece 20 is in position within the holding fixture 21 so that a welding operation may take place. When the welding operation is completed, the welded assembly 17a is released from the rotatable fixture 21 and the machine bed 34 is moved away from the spindle 14. That portion of the welded assembly 17a held within the rotatable holding fixture is thereby removed from the spindle.

Hydraulic cylinder 71 is then actuated to retract jaw 19 from clamping engagement with the welded assembly 17a. As jaw 19 retracts, kickout lever 67 will contact the welded assembly and it will come to rest in the small depression 66 of the kickout lever. If the welded assembly should have a tendency to stick within jaw 19, it will come in contact with kickout lever 68 and be forced out of the jaw.

When the welded assembly 17a is released by jaws 18 and 19, operation of the motor assembly 52 automatically starts. As motor shaft 55 rotates, arms 31 and 32 are caused to move the jaws 58 and 59 along paths 63 and 64. A completed weld assembly 17a is picked up from the fixture 13 by jaw 59 and further movement of arms upward will cause jaw 58 to pick up a non-rotatable workpiece 17 from the loading rack 11. Further upward movement of the arms will cause jaws 58 and 59 to straddle the unloading rack 12 and the completed weld assembly 17a is deposited onto the rack. The completed weld assembly 17a may for example, roll down the rack and be deposited into a collection container or onto a conveyor belt.

As the motor shaft 55 continues in one revolution of travel, the arms 31 and 32 continue on their downward movement as outlined by envelopes 63 and 64. At the moment that the jaws 58 and 59 clear the clamping jaws 18 and 19, pin 99 depresses limit switch 94 which actuates hydraulic cylinder 71 to clamp the workpiece 17 between jaws 18 and 19. The arms 31 and 32 continue in motion until pin 100 depresses limit switch 95 which signals motor assembly 52 to stop. At this point, the fixture 10 is again in a rest position as shown in FIG. 1.

As the arms 31 and 32 are moving downwardly, the cam 107 contacts the plunger 108 of the deceleration valve 54 to absorb some of the inertial energy of the downwardly moving arms. The deceleration valve slows the movement of the assembly so that no shocks are experienced as the arms 31 and 32 come to a rest position. With the arms in a rest position, the fixture is conditioned for another welding cycle. Besides stopping the motor assembly 52, the limit switch 95 may also automatically initiate a subsequent weld cycle for the welding machine.

Referring again particularly to FIG. 1, it may be noted that the links 113 are substantially shorter than the interconnecting links 73. It is also of importance to note that the motor 52 is interconnected with the arms 31 and 32 through the shorter links 113. This arrangement together with the relative spacing between the links and the length of the arms 31 and 32 serves two important functions. Initially, it may be noted that this arrangement establishes the configuration of the cyclical paths 63 and 64. The configuration of the paths is selected to facilitate reception of the workpiece 17 by the loading and unloading jaws 58 and 59. Note that the jaws are traveling almost vertical when they initially engage the workpiece. In addition, with the motor being coupled to the arms through the shorter link, a complete operating cycle is performed with one revolution of the motor. A complete operating cycle includes removal of a finished workpiece from the jaws 18, 19 by the jaw 59 and insertion of a new workpiece 17 by the loading jaw 58. Within the present embodiment, each cycle also includes the depositing of a finished workpiece in the unloading rack 12 and removal of another workpiece from the loading rack 11. It is particularly desirable to limit the motor to one revolution for each operating cycle since this greatly simplifies control of the parts handling fixture through the limit switches 94, 95 and the switch 53 for deactuating the deceleration valve 54.

We claim:

1. A parts handling fixture for moving workpieces from a loading rack means to a work fixture and for moving finished workpieces from the work fixture to an unloading rack means, comprising
a support structure,
an elongated arm with spaced apart workpiece loading and unloading means,
rotating link means pivotably interconnecting the elongated arm at two locations with the support structure, and
motor means for moving the arm relative to the support structure,
the interconnection of the rotating link means with the arm and support structure being selected to cause movement of the workpiece loading means and workpiece unloading means along offset generally circular paths between the work fixture and the loading rack means and between the work fixture and the unloading rack means respectively, the rotating link means comprising two links of different lengths being pivotably interconnected between the arm and support structure.

2. The parts handling fixture of claim 1 wherein the motor means is interconnected between the arm and support structure by means of one of the rotating link means.

3. The parts handling fixture of claim 1 further comprising limit switch control means for actuating the motor means and for deactuating the motor means after a complete operating cycle wherein a finished workpiece is removed from the work fixture by the unloading means and another workpiece is positioned in the work fixture by the loading means.

4. The parts handling fixture of claim 3 further comprising decelerator means for absorbing a portion of the inertia in the arm toward the end of an operating cycle.

5. The parts handling fixture of claim 1 wherein the motor means is interconnected between the arm and the support structure by means of a shorter one of the links.

6. The parts handling fixture of claim 5 further comprising limit switch control means for actuating the motor means and for deactuating the motor means after a complete operating cycle wherein a finished workpiece is removed from the work fixture by the unloading means and another workpiece is positioned in the work fixture by the loading means.

7. The parts handling fixture of claim 6 further comprising decelerator means for absorbing a portion of the inertia in the arm toward the end of an operating cycle.

8. The parts handling fixture of claim 5 wherein the work fixture is a part of a friction welding machine for securing a weld member in relatively rotatable relation with another weld member.

* * * * *